G. F. HALL.
LAUNCHING DEVICE FOR LIFEBOATS.
APPLICATION FILED DEC. 23, 1918.

1,389,869.

Patented Sept. 6, 1921.

WITNESSES:
Edgar L Bowen
Madeleine E. Stone

INVENTOR.
Geo Frederic Hall.

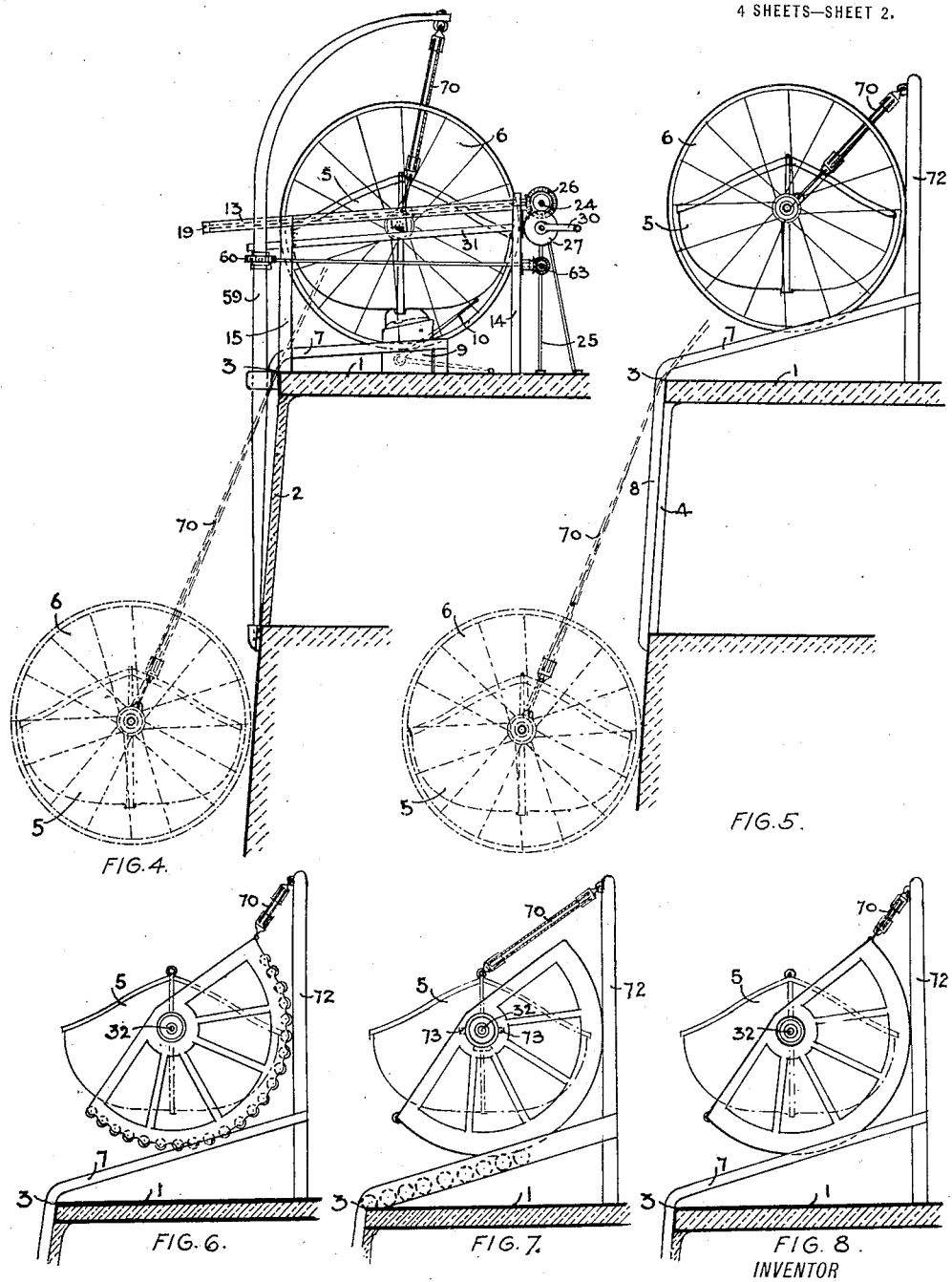

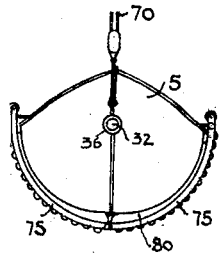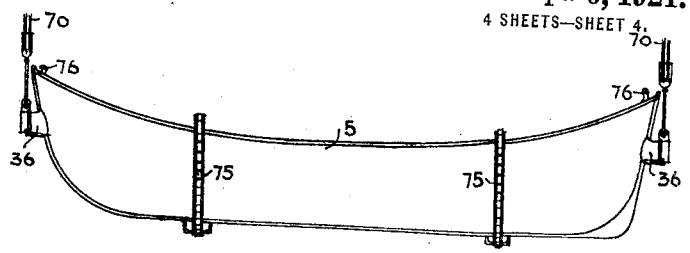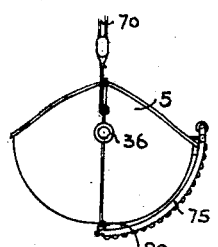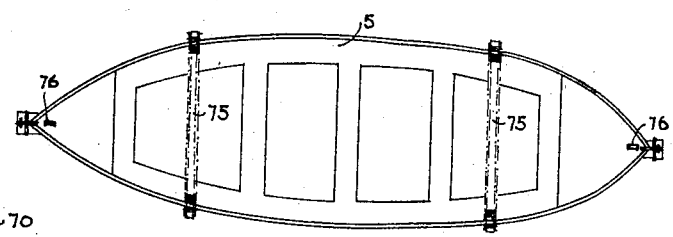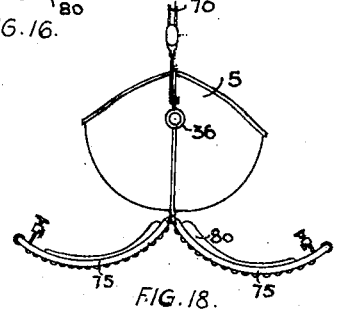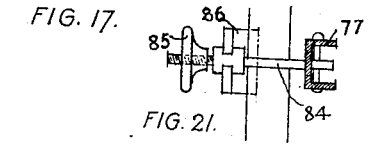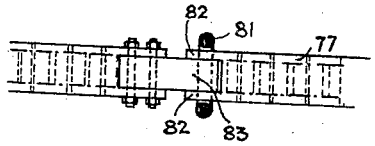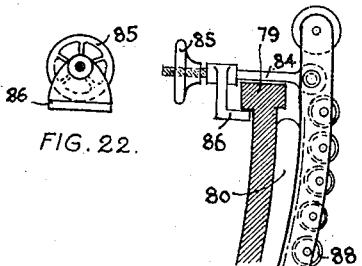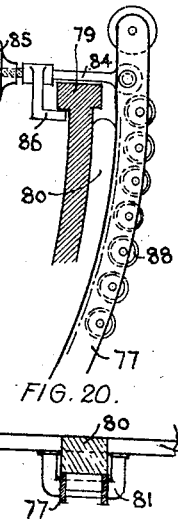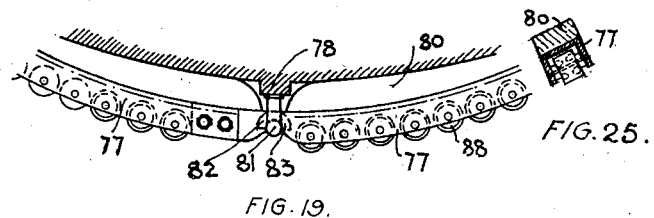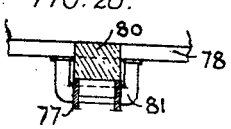

UNITED STATES PATENT OFFICE.

GEORGE FREDERIC HALL, OF PROVIDENCE, RHODE ISLAND.

LAUNCHING DEVICE FOR LIFEBOATS.

1,389,869.     Specification of Letters Patent.     Patented Sept. 6, 1921.

Application filed December 23, 1918. Serial No. 268,080.

*To all whom it may concern:*

Be it known that I, GEORGE FREDERIC HALL, a citizen of the United States, residing at Providence, in the county of Providence and State of Rhode Island, have invented certain new and useful Improvements in Launching Devices for Lifeboats, of which the following is a specification, reference being had therein to the accompanying drawings.

My invention relates to improved devices and equipment for the launching of lifeboats from ships at sea.

The object of my invention is to make it possible for every lifeboat, carried by a ship, to be easily and rapidly launched, regardless of the relative angle of the deck of the ship with the horizontal plane of the sea; to insure such launching when the ship is rolling from side to side or pitching in a seaway and particularly to overcome the difficulty, and oftentimes the impossibility, of lowering the lifeboats resulting from the heeling or listing of the ship from the perpendicular following accident. As a result of injury below the water line a ship invariably heels over on one side and usually under such conditions the lifeboats on the opposite side cannot be launched and the life saving equipment provided is thus reduced by one-half. My improved devices overcome this difficulty and also provide means for securing the lifeboat in launchable position upon the deck or launching platform as well as for moving and guiding it laterally, and under positive control to a position outboard of the side of the ship, and downward to the water. By a combination of means the outboard "swing" of a suspended lifeboat under certain conditions is overcome and in others is much reduced and damage to the lifeboat from any such cause is minimized or entirely prevented. These and other features designed to simplify and safeguard as well as to insure more rapid launching, are hereinafter described, illustrated in the drawings and finally pointed out in the claims. The specifications describe and the drawings illustrate certain devices and fittings which are adaptable for use with the launching devices shown and described in my application for launching devices for lifeboats, filed March 18, 1918, and allowed April 5, 1918, the issue of which has been deferred at my request.

In the drawings Figure 1 is a view of the launching equipment, in position upon the deck of a ship, taken in side elevation looking outboard toward the rail or edge of the deck, the cross hatched base line of the figure representing said deck. The end to end length is somewhat shortened, as indicated by the broken lines.

Figure 2:
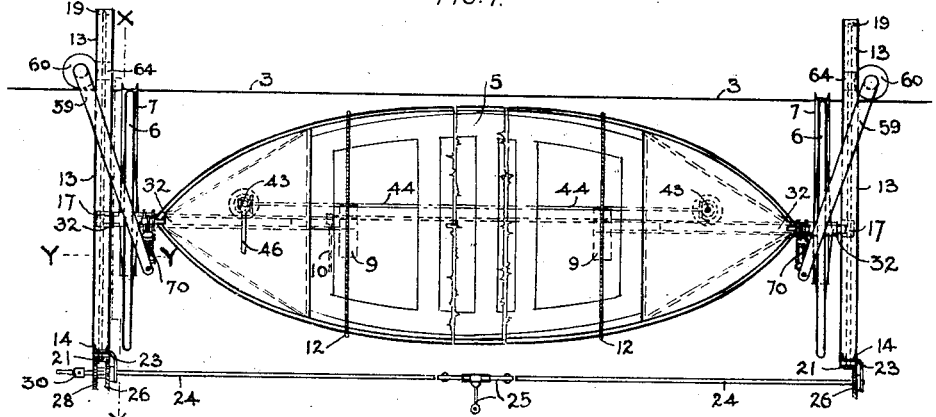
Fig. 2 is a horizontal plan view of the same, the edge of the deck being toward the top of the figure.
Figures 3, 3A:
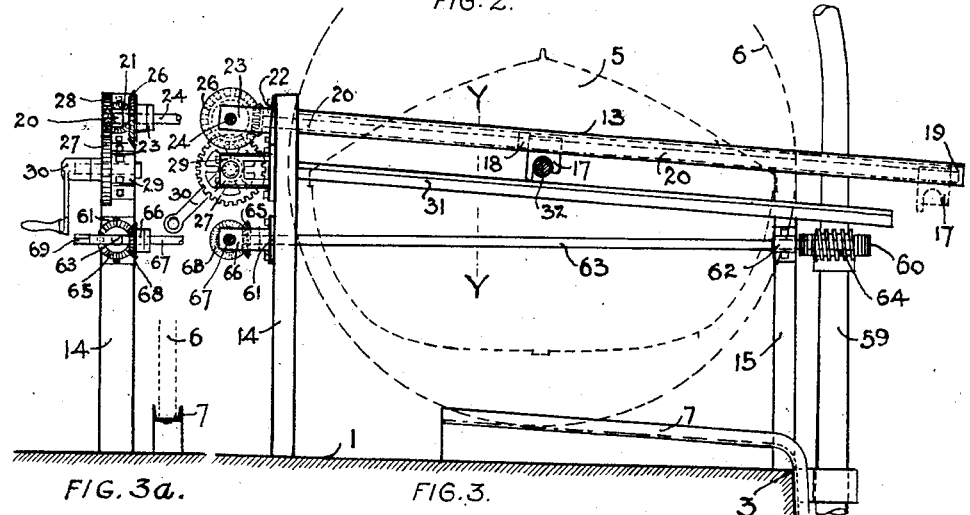
Fig. 3 is a detailed cross section, at enlarged scale, taken on line X—X of Figs. 1 and 2, the relations of the lifeboat and its wheels being shown by dotted lines.

Fig. 3$^a$ is an elevation of the inboard support of the operating devices shown in Figs. 1 and 2 and 4 and again at larger scale in Fig. 3; dotted lines indicate the wheel location.

Fig. 3$^b$ (shown on another sheet) is a cross section, at still larger scale, on lines Y—Y of Figs. 2 and 3.

Figure 1:
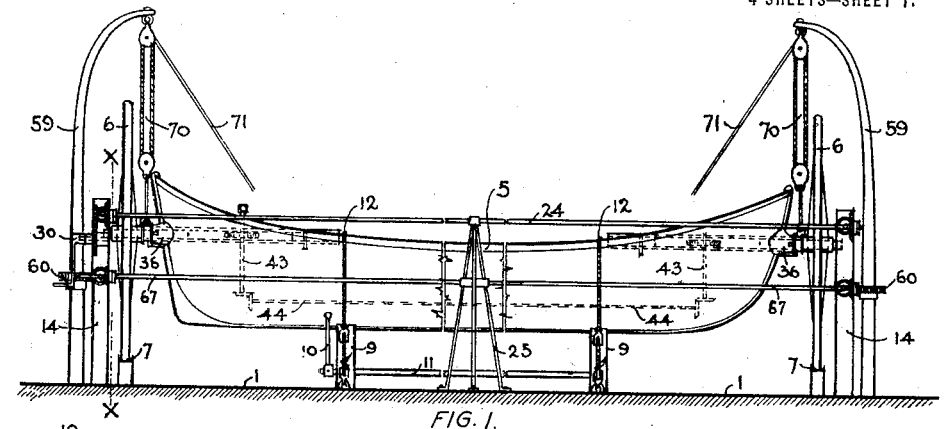

Fig. 4 is an end elevation (left) of the assembled equipment shown in Figs. 1 and 2; upper and intermediate decks and the side of ship are shown in cross section by hatched lines and the lifeboat with its guiding wheels, supporting tackle etc. is shown by dotted lines in one of its suspended and relative positions against the side of the ship.

Fig. 5 is a similar elevation showing alternative suspending, guiding and controlling equipment. In this figure the upper deck is shown supported by stanchions from the next lower deck.

Figs. 6, 7 and 8 each show end elevations of lifeboats equipped with various types of suspending, guiding and controlling devices, including substitutes for wheels, which are more fully described in the specifications.

Figure 9:
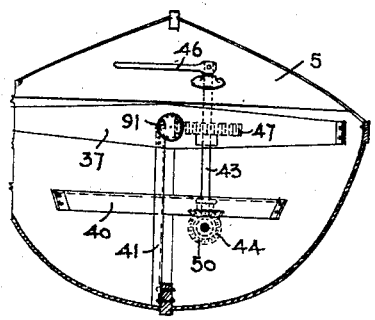
Figure 10:
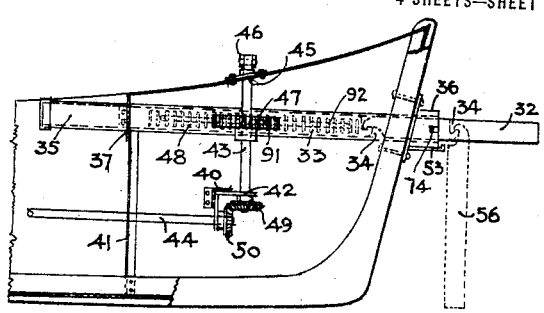
Figure 3B:
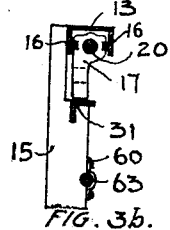
Figure 11:
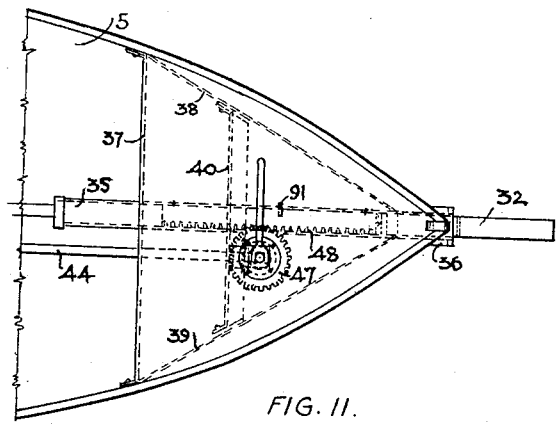
Figure 12:
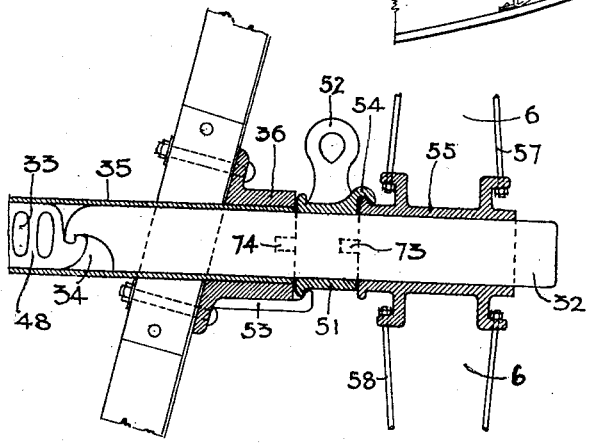
Figure 13:
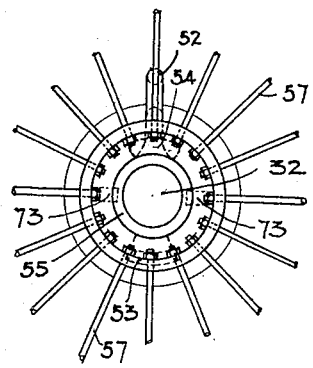

Figs. 9, 10, 11, 12 and 13 are drawings, at enlarged scale, showing details of one end of the lifeboat and illustrating methods of detachably securing the wheels, rockers, etc. to the end of the lifeboat and showing the mechanism for releasing same and the lifeboat from its securing, suspending, guiding and controlling devices. Fig. 9 is a vertical cross section taken adjacent to the stern of the lifeboat (shown at the left in Figs. 1 and 2). Fig. 10 is a vertical lengthwise section through the middle of the stern post of the lifeboat, cross hatching being omitted to avoid confusion of the drawing. Fig. 11 is a horizontal view, (from above) of the stern of the lifeboat. Fig. 12 is a vertical section (at still larger scale) of the stern post showing the outwardly projecting shaft and the mechanism for securing the suspending means and wheel, and Fig. 13 is an elevation of the wheel hub, viewed from opposite the end of the lifeboat.

Figs. 14 to 24 inclusive illustrate an alternate type of lifeboat equipment usable with the launching devices hereinbefore referred to, in which detachable fenders or rockers are substituted for the wheels and attached to the side of the lifeboat intermediate its ends.

Fig. 14 shows an end elevation, Fig. 15 a side elevation, Fig. 16 another end elevation and Fig. 17 a plan of a lifeboat, with the fenders or rockers in place; Fig. 18 is an end elevation of a lifeboat showing the fenders or rockers partly detached and falling away therefrom and Figs. 19 to 25 inclusive, are drawings at an enlarged scale of various details of the fenders or rockers and their attaching and releasing mechanism.

My improved launching device includes a lifeboat equipped with a wheel, rocker or similar device at its bow and stern as set forth in my application, Serial No. 223,240, filed March 18, 1918 and hereinbefore referred to. In the drawings such a lifeboat is shown in position upon its launching platform formed by the deck 1 and side 2 of a ship, intersecting at an edge or gunwale 3. In Fig. 5 a part of the side of a ship is shown with the upper deck supported by the stanchion 4, the intermediate deck being open on its side.

Inasmuch as the launching apparatus at one end of the lifeboat duplicates in most of its details that at the opposite end, the numbering, in order to avoid confusion and crowding of the drawings, is in some cases omitted from one side or the other and in the description the singular is used when it is considered that the use of the plural might be confusing, and vice versa.

The lifeboat 5 has a wheel 6 at each end, the perimeter of the rim of which engages with an inclined and flanged track 7. These two tracks 7 are parallel to each other and extend at approximately right angles to the gunwale and at right angles to the longitudinal line extending from end to end of the lifeboat through the axis of the wheels 6, and their outer ends terminate in a curve which extends over the edge of the deck 3 and down on the side of the ship. The tracks may be level or inclined and laid upon the deck or raised slightly above it. Under certain conditions the tracks may be omitted and the wheels bear directly upon the deck. When the side is unbroken by openings these tracks will be carried down only a short distance but in case of an open or promenade deck they will span the opening as shown at 8 in Fig. 5. The placing and adjustment of these tracks is important inasmuch as edge or rail 3 at the junction of the deck and side of a ship follows a continuously curving line from bow to stern and the deck slants from the center of the ship toward the rail as well as from bow to stern. Both rails have the same pitch and they are placed parallel to each other and so located and secured that a straight line, drawn from any point on one track to a corresponding point on the other, will parallel the longitudinal line extending through the axis of the wheels attached to the lifeboat. Parallel lines and planes are thus established for assembling and operating the entire launching equipment. Upon the deck are mounted the adjustable blocks 9 operable through the lever handle 10 and shaft 11 for raising and lowering the lifeboat. These blocks engage the keel of the lifeboat and carry the weight thereof except when in their lowered position it is transferred through the axle and wheels of the lifeboat to the tracks 7. Rope lashings or watch tackle 12 attached to eyebolts and cleats on the deck of the ship secure the lifeboat firmly in place, resting upon the blocks, between launching periods.

Launching rails 13, paralleling and inclining like the tracks 7, located one adjacent to each the bow and stern of the lifeboat, are rigidly supported from and secured to the deck by uprights 14 and 15. These rails overhang outboard of the edge of the deck and with the uprights support and carry most of the directly acting operating mechanism. As shown at large scale in Figs. 3, 3ª and still larger in Fig. 3ᵇ, the rails 13 are channel shaped and are fitted with machined guides 16 upon which slide the travelers 17 shown in solid lines at their inboard positions near the center of Fig. 3 and by dotted lines in their extreme outboard position. A fixed stop 18 limits the inboard and a combined stop and bearing 19 limits the outboard progress of the traveler 17. Each traveler is a metal block of the shape indicated with a front face and a longer rear face and is socketed on its inner side, next lifeboat, to receive the end of the adjustable shaft 32 of said lifeboat as later described. Below the launching rail 13 and parallel to it is the subrail 31 also secured to uprights 14 and 15. The traveler 17 moves forward and back within the launching rail 13, actuated by the screw 20, threaded through the traveler and extending through stop 18; the screw 20 bearing at its outer end in the stop and bearing 19 and adjacent to its inner end in the upright 14 and flanges of the offset bearing block 22, through which it extends. Upon its inner end is mounted the bevel gear 21. A lug 23 extends from the offset bearing block 22 which is attached to the upper part of upright 14. Each of these two lugs 23 of bearing blocks 22, one on each upright, receive the ends of the connecting shaft 24 which extends between the uprights at each end of the lifeboat and is supported at its center by the tripod and bearing 25 as shown in Figs. 1, 2 and 4. At each end of the shaft is a bevel gear 26 meshing with the gear 21 and at its manually operated end is the spur gear 28 meshing with the spur gear 27 which is secured to a stub shaft bearing in the offset bearing block 29. The end of the stub shaft is squared to receive the socketed crank handle 30; the turning of the crank 30 revolves the gears 27 and 28 and the shaft 24 and this shaft transmits motion through gears 26 and 21 to the screws 20 which revolving in their bearings and secured against forward thrust by the stops and bearings 19, cause the travelers 17 to move forward and backward along said screw, depending upon the direction of rotation of the crank 30; these travelers, moving in unison and at the same speed, cause the lifeboat to move at right angles to its axis and at speeds relative to the gear proportions and the speed at which crank is turned. During its travel the weight of the lifeboat is supported by the wheels at its ends from the tracks 7 and as these tracks incline at the same angle as the launching rail 13 the projecting ends of shafts 32, upon which the wheels are mounted, must hold their position within the sockets of the travelers 17 until automatically released at the overhanging ends of the launching rails 13 as hereinafter described. Angle rails 31 parallel launching rails 13 and are adapted for sliding contact with the long side of the traveler 17 to provide a support upon which the projecting ends of shafts 32 would slide following damage to the wheels and thus preventing the dropping of one or both ends of the lifeboat. Should such accident occur the lifeboat could still be forced forward, supported by the shaft ends 32, to the overhanging terminus of the subrail at which time the davits and suspending tackle would take up the load as hereinafter described. The launching rails 13, subrails 31 and their supports comprise the "launching ways" hereinafter referred to; all these rails and the tracks are preferably placed parallel to each other.

The lifeboat and its adjustable shafts, suspending means and wheels equipment, is similar to that shown and described in my application, Serial No. 223,240, filed March 18, 1918, except for certain modifications in details made necessary for use with the mechanical launching equipment herein specified. The same relations between the lifeboat itself and the perimeter of its wheels and of the axial line and planes is maintained. For use with the launching equipment herein described the lifeboat is equipped with a modified type of mechanism for actuating and adjusting the shafts and insuring that both shafts, one at each end of the lifeboat, move in unison as they are projected outwardly or withdrawn within the boat. This is important to the proper functioning of the complete launching equipment.

As shown in Figs. 9, 10, 11 and 12, which are drawings of the stern of the lifeboat (the bow being similarly equipped except for the upwardly extending end of the vertical shaft 43 equipped with the lever 46), shafts or axles 32 are adapted for projection at each end of the lifeboat. These shafts or axles are each in two sections numbered 32 and 33; the end sections 32 are releasably joined to the inner sections 33 at the joint 34. These double shafts slide inwardly and outwardly within the tube or casing 35, which is capped at its inner end and terminates at its outer end in the hub bearing 36 which is secured to the bow (and stern) of the lifeboat. The axes of all these shafts are within the longitudinal plane bisecting the stem and stern of the lifeboat. The casing 35 is rigidly built into the lifeboat and supported in place by braces and struts 37, 38, 39, 40 and 41 which are in turn secured to the gunwale, stem, stern, keelson and other structure of the lifeboat. Carried upon the angular bearing 42, supported by brace 40 at each end of the lifeboat is the vertical shaft 43 and the horizontal shaft 44. The former extends upwardly to another bearing 45 secured to the decked in end of the lifeboat and at the stern projects above the deck and receives the lever 46 which is secured with a hinge joint to the upper end of shaft 43 so that it can be moved through a vertical arc for quickly revolving the shaft 43 horizontally in either direction. Along one side of each of the inner sections 33 of the shafts are cut teeth 48 making of these sections a kind of rack which meshes with the teeth of the pinion gear 47 which is secured to and rotates with the vertical shaft 43, the side of the casing 35 being perforated to permit the meshing of said teeth. The shaft 33 is prevented from rotating within the tube 35 by a pin 91 driven into the shaft and projecting outwardly and through a longitudinal slot 92 in the opposite side of the tube— this pin and slot also limit the travel of shaft 33. The horizontal shaft 44, supported near its ends by the angular bearings 42 and intermediate its ends by other bearings secured to bulkheads and other structure (not shown) of the lifeboat, has a bevel gear 50 meshing with a bevel gear 49 dependent from the lower end of the vertical shaft 43. Mounted on the outwardly extending ends of sections 32 of the shafts or axles, as shown in detail in Fig. 12, is the collar 51 with the eye 52 to which is secured the tackle for suspending the lifeboat from the ship. The collar has an annular flange around its inner edge which engages with the knuckle 53 mounted on the hub bearing 36, and itself carries another knuckle 54 which engages with an annular flange formed on the inner end of the wheel hub 55 of the wheel 6. The collar 51 and the wheel hubs 55 revolve freely around the shaft ends 32, and while the knuckles 53 and 54 engaged with the annular flanges provide for such movement and prevent the wheels and collars from working outwardly and dropping from the ends of the projecting shafts 32, they also allow the wheels and collars to drop off *seriatim* as the said shafts 32 are withdrawn within the boat by the mechanism above described. In order to assemble the collars and wheels in their secured position upon the shafts they must first be alined in position and the shafts 32 projected outwardly and through them.

The mechanism above described and detailed at enlarged scale in Figs. 9, 10, 11, 12 and 13 is operable to slide the double shafts in both outwardly and inwardly directions of the bow and stern of the boat through the turning of the lever 46 in a horizontal direction. In order to facilitate and hasten results this lever can be swung over through a vertical arc to be operated from port or starboard of its upright shaft. The double shafts 32—33 are shown as bearing for their full length, when drawn inboard, within the tube or casing 35, thus insuring continuous guidance throughout their movement. These shafts or axles slide fore and aft of the lifeboat but do not revolve. As seen in Fig. 12 the outer ends of the shafts 32 project beyond the wheel hub 55 to enter the socketed recess in the travelers 17. The engagement of these shafts with the movable travelers supplies the means for moving the lifeboat laterally of its length and for controlling the speed of movement. Once the connection is made the boat is locked in place and is held in position endwise and confined to sidewise travel on fixed lines at right angles to the longitudinal axial line extending lengthwise of the lifeboat through its shafts and axles. The lifeboat can be released by the withdrawal of the ends of shafts 32 within the wheel hubs 55; if not so released it continues its sidewise travel until it reaches a predetermined position with relation to the deck edge of the ship when the shaft ends automatically leave the sockets of the travelers as the lifeboat begins its downward travel over the edge and toward the water, supported from its suspending means through eyes 52 and collars 51 and guided by its wheels 6 which contact with the side of the ship as shown in Figs. 4 and 5. Movement of the lever arm 46 to the right withdraws the projecting ends of the shafts or axles inwardly. When withdrawn to the outer rim of the wheel hubs 55 the lifeboat is released from control through the travelers 17; further withdrawal to the outer rims of the collars 51 releases the wheels and withdrawal within the hub bearings 36 of the lifeboat releases the collars 51 and the lowering tackles by which the lifeboat is suspended. A reverse movement of the lever arm 46 forces the double shafts 32—33 outwardly until the joints 34 arrive at the outer ends of the hub bearings 36 when the shaft sections 32 are released and fall away from the lifeboat, as shown by dotted lines 56 in Fig. 10, carrying with them the wheels 6 and hubs 55 and the suspending means 51, 52, 54. This entire securing and releasing mechanism above described is duplicated at each end of the lifeboat (except for the lever 46) and operates in unison to release both ends simultaneously, the shaft 44 providing the connection between the two. Each of the wheels 6 has the hub 55 and spokes 57—58 shown in Figs. 12 and 13. The radius of each wheel from its axle to its perimeter always exceeds in dimension any dimension measured at right angles to and from the axial line of shafts 32 to any part of the lifeboat or its fixed appurtenances and inasmuch as the suspending means and wheels are mounted on the shafts the lifeboat, whether at rest or moving sidewise across the deck, or vertically suspended from the davits, or being lowered with the wheels in contact with the side of the ship, is always in a perpendicular position and can be rotated in a complete circle around the axis of the shafts and within an imaginary cylinder extending between the two wheels and having diameter equaling that of the perimeter of the wheels.

The lifeboat will be guided and controlled throughout its progress to the edge of the deck by the mechanism hereinbefore described. Upon going over the edge it will be suspended and lowered to the water in any of the several accepted ways, depending to some extent upon its size and capacity. For the smaller boats the usual types of block and tackle will be used and for larger outfits wire ropes running over pulleys and controlled by reels, either hand or power driven, may be used. This tackle may be supported in part from any of the several types of davits now in use or from fixed appliances placed upon the deck of the ship. Any well known and approved suspending and lowering equipment is adaptable for use with my devices provided it is attachable at each end of the lifeboat and controllable either from the lifeboat itself or from the launching platform for lowering the boat to enter the water on a nearly even keel.

Davits that operate to project their upper ends both inwardly and outwardly of the rail of the ship are particularly adaptable in that they provide a means for lifting a lifeboat, minus its wheels, to a position on deck where wheels can be supplied; such davits can also be used for launching a lifeboat for drill as well as for purposes other than life saving. Furthermore, the combination of rotating or swinging davits with my other launching equipment provides additional means for handling a lifeboat, as later described, to insure safer results under certain conditions of shipwreck.

As shown in Figs. 1, 2, 3 and 4 the launching equipment includes swinging davits 59, adapted to rotate horizontally and secured to the side of the ship in the usual way. Each davit is fitted with a horizontal gear 60; the supporting uprights 14 and 15, before described, carry the bearings 61 and 62 in which rotate the shafts 63 each having at its outer end a worm 64 meshing with the gear 60 and at its inner end a bevel gear 65. An offset bearing 66 secured to upright 14, carries the end of a horizontally rotating shaft 67 which extends to the opposite upright with a central support in bearings on the tripod 25. At the ends of shafts 67 are bevel gears 68 meshing with bevel gears 65. One end of the shaft 67 extends beyond the gears and is squared 69 to receive the handle 30. The rotation of this handle and the shaft 67 causes the davits to turn in unison from inboard to outboard and vice versa, the worm gears operating to hold them in fixed relative positions when the turning of the handle ceases. The gears are so meshed that while the davits turn in unison, their rotation is in opposite directions one to the other.

Depending from the upper end of each davit is shown a running tackle consisting of ropes 70 carried through and attached to blocks, the upper one of which is hooked to the eye on the davit end and the lower block has a hook with an elongated shank which secures to the eye 52 of the suspending collar 51 rotatably mounted on the end of one of shafts 32—33 as before indicated. The free end of the rope 71 is brought down from the upper block and coiled and belayed within the lifeboat, to be paid out as the boat descends. The coiled rope and cleats are omitted from the drawing to avoid confusion.

Other means of securing the lowering tackle are shown in Fig. 5 where the upper block is hooked to an eye in the upright 72 which is secured and braced from the deck of the ship. This method provides quite as good a suspending and lowering means but is less adaptable for all purposes.

Attention is called to the suspension of the upper block of the tackle in a position inboard of the edge of the deck or launching platform and generally inboard of the longitudinal vertical plane of the middle of the lifeboat and the axles of the wheels. This provides for a strain upon the tackle throughout the entire period of movement of the lifeboat from its position of rest to floatation. When suspended in this manner, with the wheels resting upon inclined tracks the lifeboat, when released from its blocks 9 and other holding means, will, as the tackle is paid out, move outward and over the edge of the deck by gravity, its speed of progress controlled entirely through the lowering tackle.

Two lashings, or watch tackles 12, attached and belayed to the deck and drawn across the lifeboat are adapted for use as additional securing means when the lifeboat is at rest.

The process of launching a lifeboat thus equipped is substantially as follows:

The lifeboat is at rest in position upon the launching platform, its weight supported by the blocks 9 and the lashings 12 further securing it in place; the wheels 6 are lifted free of the tracks 7 by the blocks 9 and carry none of the weight of the lifeboat. The ends of the shafts 32 are engaged with the travelers 17; the suspending tackles are attached to the lifeboat and to the inwardly projecting arms of the davits so that they draw on lines paralleling the run of the wheels and the ends of the ropes are belayed and coiled in the lifeboat ready to be paid out.

The crew and passengers enter the lifeboat; the officer in charge stations a man on the ship's deck at the location of the crank handle 30 and takes his place in the lifeboat adjacent to the releasing lever 46 and in position to handle the ropes of one of the lowering tackles, another man being stationed at the opposite rope. At a signal from the officer the lashings 12 are released and the lever 10 controlling the blocks 9 is turned, dropping the lifeboat and allowing its weight to rest through the wheels upon the tracks 7. The lifeboat is now ready for launching and the man at his station on deck turns the handle 30 which forces the travelers forward and the lifeboat approaches the edge of the deck, the tackles being gradually paid out from the lifeboat but always kept under slight strain. As the perimeters of the wheels roll over the edge of the deck and start downward, the ends of the shafts 32 automatically release themselves from the sockets of the travelers 17 and the lifeboat continues its descent, suspended from the tackles and at a speed which is controlled by the rate at which the ropes are paid out. During this period of descent, after going over the edge, the wheels are in contact with the side of the ship except when there is a list in the direction of the side of the ship from which the lifeboat is being launched; at such times the wheels maintain this contact unless the angle of heel is excessive. When the lifeboat is afloat upon the water the officer grasps the lever 46 and moving it in one direction withdraws the ends of the shafts 32, releasing the wheels and the detaching means and the lifeboat is free to leave the ship. If for any reason the shaft cannot be drawn within the lifeboat he reverses the lever 46 and forces the shafts 32 outwardly and the wheels and the suspending means and the shafts 32 go overboard as previously described.

As the lifeboat progresses down the side of the ship as shown in Figs. 4 and 5, the tackle draws across the edge of the deck thereby shortening the line of suspension and preventing in some cases and reducing in others the side-sway or swing to which said lifeboat, launched in the usual manner, would be subjected in a sea-way with the ship rolling from side to side. To such sway is attributable much of the loss of life incident to shipwreck. Boats are stoven and made unseaworthy by crashing against the side of the ship. The shortening of the suspending tackle and decreasing of side-sway is one of the features of my invention. It is not necessary, however, for the wheels always to follow the side of the ship and at times it may be desirable that they should not do so, in which case the seaman stationed on deck at the operating handle 30, removes that handle and slips it on the shaft end 69 and by turning same revolves the davits, swinging the boat outwardly and the wheels from contact with the ship. This may be done at any time after the lifeboat moves over the deck edge and before or after it is afloat upon the water. The lifeboat may be traveling downwardly and outwardly at the same time.

The complete mechanism herein described insures positive and rapid launching of a lifeboat under all conditions and entire control of the lifeboat at all times, particularly during the period of progress from a position of rest upon the deck to a position outboard and over the side. Rolling of the ship from side to side, heel of the ship to either side, pitching of the ship from bow to stern cannot prevent the delivery of the loaded lifeboat over the side, and the ship may be "down by the head" or stern without affecting the positive operation of the equipment for this purpose.

These positive launching and sway-reducing features are thought to be entirely new and novel in the art and while the equipment previously described is believed to be the most effective there are modifications and alternatives which, while accomplishing results somewhat less efficiently, are within the scope of the invention. One of the alternatives is illustrated in Fig. 8 in which is shown the end elevation of a lifeboat equipped as hereinbefore described, except that in place of the wheels 6, skids or half-wheels are substituted, these revolving on the projecting shaft ends 32 and being detachable in the manner previously indicated in the description of the wheel releasing mechanism. These skids turn freely upon the shafts in sliding over the inclined tracks and down the side of the ship but are prevented from making a full revolution by the "pull" exerted by the suspending tackle; their radius is such as to prevent contact of the lifeboat and its fixed appurtenances with the deck, side and other surfaces over which the skids are sliding and with which they are in contact. When skids are used, in place of wheels, the suspending collars 51 and eyes 52 are omitted and the lower block of the tackle is hooked to an eye on the upper end of the skid. The upper block of the tackle may be hooked to uprights as shown in Figs. 5 and 8 or to inwardly projecting davit arms as shown in Fig 4 and the rope end led to the lifeboat and coiled for paying out as the lifeboat descends to the water. The pull of the tackle is thus always inboard, of a line co-extensive with the axial line of the shafts of the lifeboat, throughout the progress of the lifeboat to an outboard position of the ship. The force thus exerted prevents the over-roll of the skids in their sliding approach to the edge of the deck and as the lifeboat descends, when suspended with the skids in contact with the side of the ship, the skids assume a more upright position. When used with the swinging davits the lifeboat may be swung out from the side of the ship in the manner described when wheels are used. With this skid equipment the lifeboat will still retain an upright position regardless of the angle of the ship or the surface over which it is sliding. Considerable friction results from the skid combination above described and to overcome this to some extent the perimeter of the skids may be equipped with rollers as shown in Fig. 6 or the inclined tracks may be similarly equipped as shown in Fig. 7.

In Fig. 7 is shown another type of skid which is similar in construction to that shown in Fig. 8 except that while it is mounted on the shaft ends and detachable therefrom as previously described, it is equipped with two inwardly projecting lugs 73 on the inside face of the hub 55 (Figs. 7 and 12,) which enter two depressions 74 cut in the outer face of the hub bearing 36 of the lifeboat,—shown in Figs. 10 and 12. The object of this construction is to prevent the rotation of the skids around the axles while leaving them free to be disengaged from the lifeboat by the manipulation of the detaching means with which the lifeboat is equipped as before described. Such a combination is launchable with the specified equipment but the lifeboat does not maintain a perpendicular position, the skids rocking in their travel over the tracks and down the side of the ship. The weight of the lifeboat and its contents, however, prevents it from assuming dangerous angles. In Fig. 7 an alternative arrangement of the tackle is shown with its lower block hooked to an eye in the bow and stern post of the lifeboat; it is possible, in emergency, to launch the lifeboat in this way; this applies also to the tackle equipment shown or referred to in any of the figures or descriptions. If the tackle is so attached to the lifeboat the latter will not retain its upright position during all periods of the launching process.

The principle herein described for preventing and decreasing the side-sway of a suspended lifeboat and the damage resulting therefrom, by causing the suspending and lowering tackle to impinge upon and draw across the edge formed at the intersection of the side and deck of a ship, is thought to be new in the art. If so, any combination of means which will produce such results are within the scope of my invention. One such combination, differing from others previously described in that the lifeboat is equipped with fenders or rockers not attached to the bow and stern, is shown in Figs. 14 to 25 inclusive.

Fig. 14 shows an end elevation, Fig. 15 a side elevation and Fig. 17 a plan of a lifeboat equipped with two fenders or rockers 75 attached to and surrounding the bottom of the lifeboat, and Fig. 16 shows in end elevation a lifeboat having a similar device part way around the outside of boat, from keel to gunwale. Fig. 18 is an end elevation showing the fenders or rockers in one of the positions they would assume upon being released from their point of attachment to the gunwale of the lifeboat and swinging downward preparatory to dropping clear of the lifeboat. Fig. 19 shows, at enlarged scale, a cross section through the keel of the lifeboat and an elevation of the fenders and with Fig. 23, a plan, and Fig. 24, a side elevation, illustrate the method of attaching the lower ends of the fenders to the lifeboat. Fig. 25 is a cross section through a fender showing a roller adapted for bearing upon the tracks 7. Fig. 20 shows, at enlarged scale, a cross section through the gunwale of the lifeboat, a side elevation of the upper end of a fender and the device for securing it to the lifeboat. Fig. 21 is a top plan view and Fig. 22 an end view of the securing device.

These fenders or rockers are curved in shape, either semi-circular or conforming to the cross-section of the lifeboat and are adapted to be releasably secured in pairs to the exterior of the lifeboat as indicated, two on each side or two on one side only. These rockers or fenders provide means which will engage with tracks like 7, previously described, located on the deck of the ship in position to receive them. This combination of tracks, fenders or rockers provide runways and guides for use with the other launching mechanism for conveying a lifeboat to a position outboard of the side of the ship; during the period of lowering the fenders will contact with the side of the ship, preventing the lifeboat from touching.

To avoid confusion in the drawings, and because previously described in detail, the releasing mechanism for the suspending means is omitted in these figures. It is to be understood, however, that the hubs 36 axles 32 and other details for sliding the said shafts, and of the releasing mechanism, are to be completely installed. except that the outboard extension of the shafts will be less because of the omission of the wheels, or skids, at ends of the lifeboat. The ends of shafts 32 are extendable to engage the travelers 17. It is also to be understood that the lower block of the suspending tackle may be hooked into eye bolts 76 at the ends of the lifeboat and releasably controlled by any of the devices now in use for this purpose. This combination of lifeboat and fenders is launchable with any of the described ship equipment but in the process the lifeboat does not maintain a perpendicular position at all times and results would be much less satisfactory than those following the use of other equipment herein described. The shortening of the suspending means and the lessening of side-sway or swing will follow the use of this combination.

The fenders or rockers 75 have a channel frame 77 of curved shape, adapted to the cross sectional contour of the lifeboat but to be free of the lifeboat except at their points of contact with the keel 78 and gunwale 79. Attached to the inner side of fenders is the wedge block 80, shaped to the shell of the lifeboat, having width equal to the channel frame 77, and also secured to the keel is the loop shaped hanger 81. The lower end of one channel frame 77 is provided with a hook 82 adapted for hinged connection with the loop 81 and so arranged that when the fender swings downward, after being released, it will disengage itself. Where fenders are paired on opposite sides of the lifeboat the hooks 82 and 83 will mesh as shown in Figs. 19 and 23. The hooks are formed to thrust against the loop 81 and the distance vertically between the shell of the lifeboat and the fender is filled by the wedge block 80 thus holding the hooks in place. The upper ends of the fenders are provided with a fastening having a shank 84 pivoting on the channel 77 and extending inboard over the gunwale and the inner end is screw-threaded to receive the wheel 85. An L-shaped clamp 86 is loosely fitted to slide along the shank 84 and to engage to inside of the shell of lifeboat beneath the gunwale and the wedge block 80, attached to channel frame 77, is arranged for contact with the outside of the shell of the lifeboat beneath the gunwale. Screwing up of the wheel 85 clamps the fender in place and a reverse operation releases it. Upon being released the fender swings down by gravity and automatically detaches itself from the keel and sinks. The channel frame 77 may be equipped with rollers 88 for use with a plain track line 7 in Figs. 6 and 8, or may be without rollers and used with a track having rollers as shown in Fig. 7, and can be used without rollers upon a plain track although considerable friction would result from such combination.

I claim as a novel and useful invention and desire to secure by Letters-Patent:—

1. In a launching device for lifeboats the combination of a part of the side and a part of the deck of a ship intersecting at a gunwale, two parallel rails above said deck extending at right angles to said side and inclining downwardly in the same plane and curving over and terminating outwardly of said gunwale, uprights upon said deck supporting two other rails paralleling each other and said first named rails, a traveler movable along each said second named rails, mechanism including rotatable means adapted to move said travelers in unison forward and backward along said second named rails, a lifeboat equipped with a trunnion positioned at the middle of the bow and another at the middle of the stern on the level axial line of the lifeboat, each trunnion engaging one of said travelers, said lifeboat equipped with detachable fenders, radially curving from said axial line, fitted to support it from and adapt it for lateral travel along said first named rails to a position overhanging said gunwale, means adapted to actuate the traveler mechanism to move said equipped lifeboat laterally of its length to said position of overhang, means adapted to limit endwise movement of the lifeboat throughout its lateral progress and the whole so assembled and adapted that said lifeboat is fended from contact with said deck or gunwale or side of the ship during such progress.

2. In a launching device for lifeboats the combination of a part of the side and a part of the deck of a ship intersecting at a gunwale, two parallel rails above said deck extending at right angles to said side and inclining downwardly in the same plane and curving over and terminating outwardly of said gunwale, uprights upon said deck supporting two other rails paralleling each other and said first named rails, a traveler movable along each said second named rails, mechanism including rotatable means adapted to move said travelers in unison forward and backward along said second named rails, a lifeboat equipped with a trunnion positioned at the middle of the bow and another at the middle of the stern on the level axial line of the lifeboat, each trunnion engaging one of said travelers, said lifeboat equipped with detachable fenders, radially curving from said axial line, fitted to support it from and adapt it for lateral travel along said first named rails to a position overhanging said gunwale, an adjustable chock block upon said deck operable at will to releasably position said lifeboat with its fending means free from contact with said first named rails and to lower it and cause said means to contact with said rails, means adapted to actuate the traveler mechanism to move said equipped lifeboat laterally of its length to said position of overhang, means adapted to limit endwise movement of the lifeboat throughout its lateral progress and the whole so assembled and adapted that said lifeboat is fended from contact with said deck or gunwale or side of the ship during such progress.

3. In a launching device for lifeboats the combination of a part of the side and a part of the deck of a ship intersecting at a gunwale, two parallel rails above said deck extending at right angles to said side and inclining downwardly in the same plane and curving over and terminating outwardly of said gunwale, uprights upon said deck supporting two other rails paralleling each other and said first named rails, a traveler movable along each said second named rails, mechanism including rotatable means adapted to move said travelers in unison forward and backward along said second named rails, a lifeboat equipped with a trunnion positioned at the middle of the bow and another at the middle of the stern on the level axial line of the lifeboat, each trunnion engaging one of said travelers, said lifeboat equipped with detachable fenders, radially curving from said axial line, fitted to support it from and adapt it for lateral travel along said first named rails to a position overhanging said gunwale, an adjustable chock block upon said deck operable at will to releasably position said lifeboat with its fending means free from contact with said first named rails and to lower it and cause said means to contact with said rails, means upon the lifeboat operable at will to detach said fenders, means adapted to actuate the traveler mechanism to move said equipped lifeboat laterally of its length to said position of overhang, means adapted to limit endwise movement of the lifeboat throughout its lateral progress and the whole so assembled and adapted that said lifeboat is fended from contact with said deck or gunwale or side of the ship during such progress.

4. In a launching device for lifeboats the combination of a part of the side and a part of the deck of a ship intersecting at a gunwale, two parallel rails above said deck extending at right angles to said side and inclining downwardly in the same plane and curving over and terminating outwardly of said gunwale, uprights upon said deck supporting two other rails paralleling each other and said first named rails, a traveler movable along each said second named rails, mechanism including rotatable means adapted to move said travelers in unison forward and backward along said second named rails, a lifeboat equipped with a trunnion positioned at the middle of the bow and another at the middle of the stern on the level axial line of the lifeboat, mechanism upon the lifeboat adapted to regulate the projection of said trunnions at will to engage them with and disengage them from the travelers, said lifeboat equipped with detachable fenders, radially curving from said axial line, fitted to support it from and adapt it for lateral travel along said first named rails to a position overhanging said gunwale, a rotatable means adapted to actuate the traveler mechanism to move said equipped lifeboat laterally of its length to said position of overhang, means adapted to limit endwise movement of the lifeboat throughout its lateral progress and the whole so assembled and adapted that said lifeboat is fended from contact with said deck or gunwale or side of the ship during such progress.

5. In a launching device for lifeboats the combination of a part of the side and a part of the deck of a ship intersecting at a gunwale, two parallel rails above said deck extending at right angles to said side and inclining downwardly in the same plane and curving over and terminating outwardly of said gunwale, uprights upon said deck supporting two other rails paralleling each other and said first named rails, a traveler movable along each said second named rails, mechanism including rotatable means adapted to move said travelers in unison forward and backward along said second named rails, a lifeboat equipped with a trunnion positioned at the middle of the bow and another at the middle of the stern on the level axial line of the lifeboat, each trunnion engaging one of said travelers, said lifeboat equipped with detachable fenders, radially curving from said axial line, fitted to support it from and adapt it for lateral travel along said first named rails to a position overhanging said gunwale, a rotatable means adapted to actuate the traveler mechanism to move said equipped lifeboat laterally of its length to said position of overhang, a running tackle, including securing means, blocks and rope rigging, at the bow and at the stern of the equipped lifeboat flexibly connecting it with the ship and adapted to be paid out proportionately to the speed and length of travel and to maintain restraining tension throughout the period of travel of the lifeboat, means adapted to limit endwise movement of the lifeboat throughout its lateral progress and the whole so assembled and adapted that said lifeboat is fended from contact with said deck or gunwale or side of the ship during such progress.

6. In a launching device for lifeboats the combination of a part of the side and a part of the deck of a ship intersecting at a gunwale, two parallel rails above said deck extending at right angles to said side and inclining downwardly in the same plane and curving over and terminating outwardly of said gunwale, uprights upon said deck supporting two other rails paralleling each other and said first named rails, a traveler movable along each said second named rails, mechanism including rotatable means adapted to move said travelers in unison forward and backward along said second named rails, a lifeboat equipped with a trunnion positioned at the middle of the bow and another at the middle of the stern on the level axial line of the lifeboat, each trunnion engaging one of said travelers, said lifeboat equipped with detachable fenders, radially curving from said axial line, fitted to support it from and adapt it for lateral travel along said first named rails to a position overhanging said gunwale, a rotatable means adapted to actuate the traveler mechanism to move said equipped lifeboat laterally of its length to said position of overhang, a running tackle, including securing means, blocks and rope rigging, at the bow and at the stern of the equipped lifeboat flexibly connecting it with the ship and adapted to be paid out proportionately to the speed and length of travel and to maintain restraining tension throughout the period of travel of the lifeboat, means upon the equipped lifeboat adapted to release said running tackle connections, means adapted to limit endwise movement of the lifeboat throughout its lateral progress, means adapted to cause automatic disengagement between the trunnions and the travelers at a predetermined stage in said lateral travel and the whole so assembled and adapted that said lifeboat is fended from contact with said deck or gunwale or side of the ship during such progress.

7. In a launching device for lifeboats the combination of a part of the side and a part of the deck of a ship intersecting at a gunwale, two parallel rails above said deck extending at right angles to said side and inclining downwardly in the same plane and curving over and terminating outwardly of said gunwale, uprights upon said deck supporting two other rails paralleling each other and said first named rails, a traveler movable along each said second named rails, mechanism including rotatable means adapted to move said travelers in unison forward and backward along said second named rails, a lifeboat equipped with a trunnion positioned at the middle of the bow and another at the middle of the stern on the level axial line of the lifeboat, mechanism upon the lifeboat adapted to regulate the projection of said trunnions at will to engage them with and disengage them from the travelers, said lifeboat equipped with detachable fenders, radially curving from said axial line, fitted to support it from and adapt it for lateral travel along said first named rails to a position overhanging said gunwhale, a rotatable means adapted to actuate the traveler mechanism to move said equipped lifeboat laterally of its length to said position of overhang, means adapted to limit endwise movement of the lifeboat throughout its lateral progress, a davit extending above said deck adjacent to each the bow and stern of the lifeboat both so mounted and adapted that their upper ends will swing inwardly and outwardly of said gunwale, securing means detachably mounted at each the bow and stern of the equipped lifeboat, a running tackle, including blocks and rope rigging, flexibly connecting between the bow davit and the bow securing means and a similar tackle between the stern davit and stern securing means, both said tackles adapted to be paid out proportionately to the speed and length of and to maintain restraining tension throughout the period of travel of the equipped lifeboat, means adapted to cause automatic disengagement of the trunnions and the travelers at a predetermined stage in the travel of the equipped lifeboat where its lateral progress ceases and its downward progress begins and to cause its further speed of progress to be controlled through the paying out of said tackles, mechanism operable at will to rotate said davits to swing their upper ends in unison inboard and outboard of said gunwale and to fixedly hold said ends in either of such or in any intermediate position to cause the said flexible tackle to impinge upon and draw across said gunwale during a period of the downward progress of the equipped lifeboat and to free such drawing contact, the fenders contacting with said rails and the side of the ship and fending the lifeboat itself from contact with said deck or gunwale or side of the ship throughout its progress to the water.

8. In a launching device for lifeboats the combination of a part of the side and a part of the deck of a ship intersecting at a gunwale, two parallel rails above said deck extending at right angles to said side and inclining downwardly in the same plane and curving over and terminating outwardly of said gunwale, uprights upon said deck supporting two other rails paralleling each other and said first named rails, a traveler movable along each said second named rails, mechanism including rotatable means adapted to move said travelers in unison forward and backward along said second named rails, a lifeboat equipped with an adjustable trunnion positioned at the middle of the bow and another at the middle of the stern on the level axial line of the lifeboat, mechanism upon the lifeboat adapted to regulate the projection of said trunnions at will to engage them with and disengage them from the travelers, said lifeboat equipped with detachable fenders, rotatably and detachably mounted upon said trunnions and radially curving from said axial line, fitted to support it from and adapt it for lateral travel along said first named rails to a position overhanging said gunwale, a rotatable means adapted to actuate the traveler mechanism to move said equipped lifeboat laterally of its length to said position of overhang, means adapted to limit endwise movement of the lifeboat throughout its lateral progress, a davit extending above said deck adjacent to each the bow and stern of the lifeboat both so mounted and adapted that their upper ends will swing in unison inwardly and outwardly of said gunwale, a securing means rotatably and detachably mounted upon each trunnion, a running tackle including blocks and rope rigging flexibly connecting between the bow davit and the bow securing means and a similar tackle between the stern davit and stern securing means, both tackles adapted to be paid out proportionately to the speed and length of and to maintain restraining tension throughout the period of travel of the equipped lifeboat, means adapted to cause automatic disengagement of the trunnions and the travelers at a predetermined stage in the travel of the equipped lifeboat where its lateral progress ceases and its downward progress begins and to cause its further speed of progress to be controlled through the paying out of said tackles, mechanism operable at will to rotate said davits to swing their upper ends in unison inboard and outboard of said gunwale and to fixedly hold said ends in either of such or in any intermediate position to cause the said flexible tackle to impinge upon and draw across said gunwale during a period of the downward progress of the equipped lifeboat and to free such drawing contact, the fenders contacting with said rails and the side of the ship and fending the lifeboat itself from contact with said deck or gunwale or side of the ship and continuously guiding said lifeboat throughout its progress from its on deck position to the water and mechanism upon the lifeboat operable at will to simultaneously actuate said trunnions to withdraw them inwardly or protect them outwardly to detach said securing and fending means and to free the lifeboat from said fenders and from the tackle connections.

In testimony whereof I affix my signature in presence of two witnesses.

GEO. FREDERIC HALL.

Witnesses:
 EDGAR L. BOWEN,
 MADELEINE E. STONE.